United States Patent [19]

Jorne et al.

[11] Patent Number: 4,567,120
[45] Date of Patent: Jan. 28, 1986

[54] FLOW-THROUGH POROUS ELECTRODES

[75] Inventors: Jacob Jorne, Birmingham; Emad Roayaie; Atul Shah, both of Detroit, all of Mich.

[73] Assignee: Energy Development Associates, Inc., Greensboro, N.C.

[21] Appl. No.: 656,893

[22] Filed: Oct. 1, 1984

[51] Int. Cl.$^4$ .................................................. H01M 4/00
[52] U.S. Cl. ....................................... 429/72; 429/101; 429/209; 429/40
[58] Field of Search ............... 429/209, 101, 105, 199, 429/46, 27, 72, 12, 14, 15, 29, 80, 34, 403

[56] References Cited

U.S. PATENT DOCUMENTS

| | | | |
|---|---|---|---|
| 3,713,888 | 1/1973 | Symons | 429/51 |
| 3,772,085 | 11/1973 | Bjorkman | 429/15 |
| 3,773,560 | 11/1973 | Bjorkman | 429/15 |
| 3,809,578 | 5/1975 | Symons | 429/51 |
| 3,813,301 | 5/1974 | Carr | 429/50 |
| 3,849,202 | 11/1974 | Pompon | 429/13 |
| 3,909,298 | 9/1975 | Carr | 429/218 |
| 3,954,502 | 5/1976 | Symons et al. | 429/39 |
| 4,071,660 | 1/1978 | Hart | 429/15 |
| 4,100,332 | 7/1978 | Carr | 429/27 |
| 4,120,774 | 10/1978 | Hart | 204/294 |
| 4,127,701 | 11/1978 | Symons et al. | 429/19 |
| 4,414,291 | 11/1983 | Breault | 429/26 X |
| 4,444,851 | 4/1984 | Maru | 429/34 X |
| 4,481,266 | 11/1984 | Littauer et al. | 429/72 X |

Primary Examiner—Anthony Skapars
Attorney, Agent, or Firm—Harness, Dickey & Pierce

[57] ABSTRACT

A flow-through porous electrode structure for electrochemical systems having flowing electrolytes is disclosed. The flow-through porous electrode structure includes a single porous electrode having two planar opposing faces, each of which provides a reaction surface for electrochemical electron-transfer reactions of the same polarity. The porous electrode features spaced passage means which extends at least in part through the electrode between the opposing faces for distributing the circulating electrolyte through the electrode. The passage means comprises a plurality of vertically spaced, generally horizontally disposed passageways extending from a first side of the porous member. These passageways having a generally circular cross section and extend substantially across the width of the porous electrode member.

6 Claims, 5 Drawing Figures

U.S. Patent  Jan. 28, 1986  4,567,120
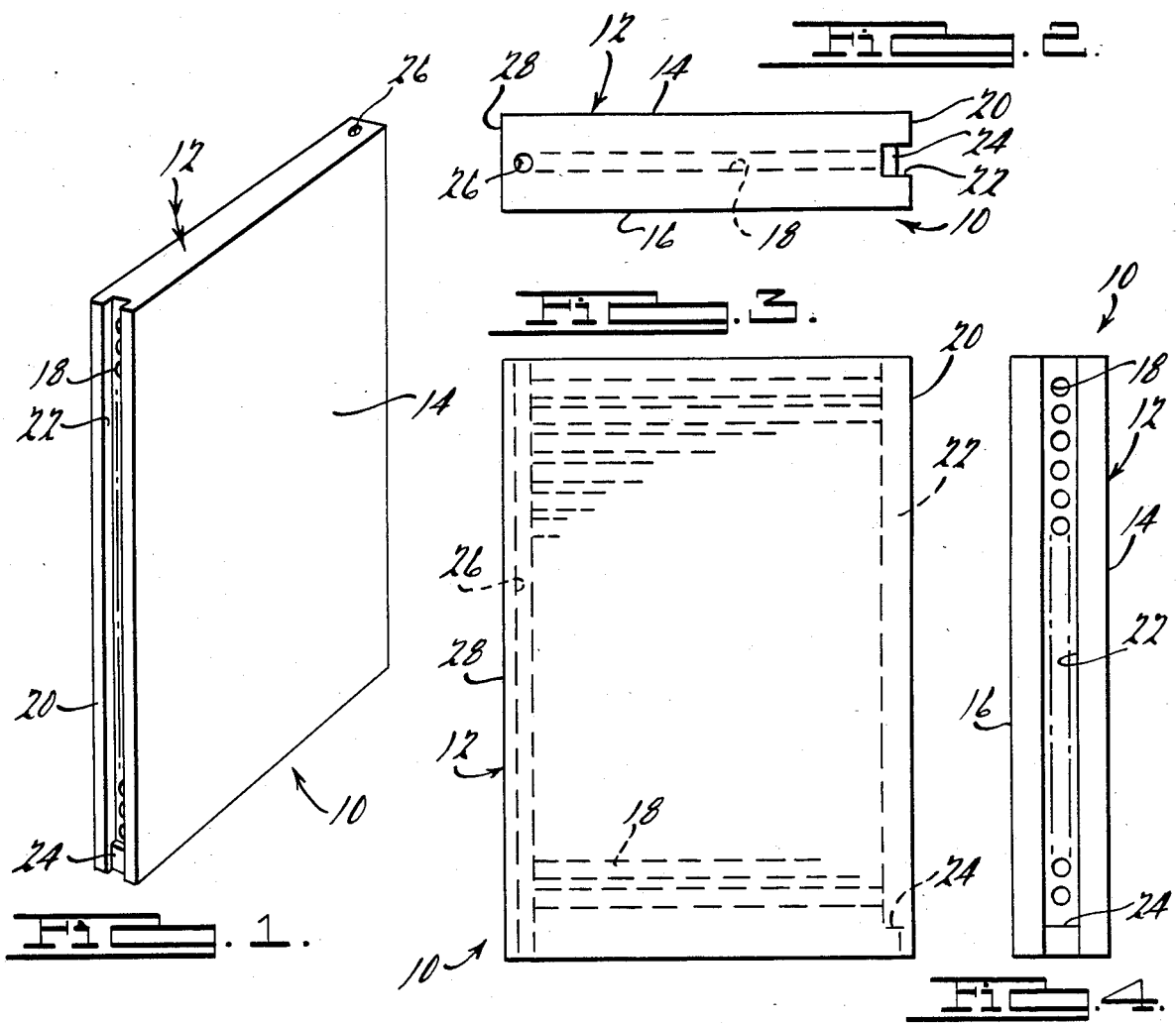
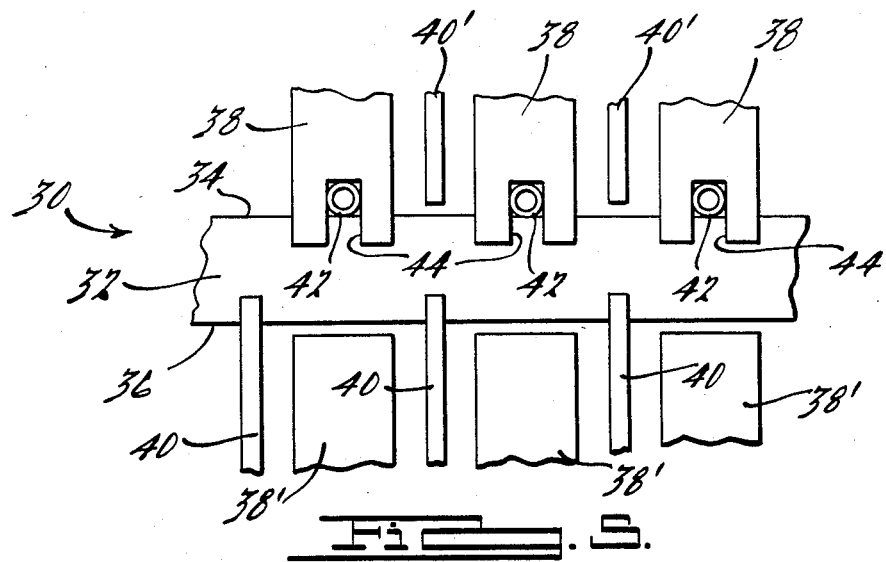

FLOW-THROUGH POROUS ELECTRODES

BACKGROUND AND SUMMARY OF THE INVENTION

The present invention relates generally to electrode constructions for electrochemical systems, and particularly to flow-through porous electrodes for energy storage battery systems having circulating electrolytes.

Energy storage battery systems of the type referred to herein include one or more of the metal-halogen battery systems, such as a zinc-chloride battery system. These metal-halogen battery systems generally are comprised of three basic components, namely an electrode stack section, an electrolyte circulation subsystem, and a store subsystem. The electrode stack section typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous metal-halogen electrolyte. The electrolyte circulation subsystem operates to circulate the metal-halogen electrolyte from a reservoir through each of the cells in the electrode stack in order to replenish the metal and halogen electrolyte components as they are oxidized or reduced in the cells during the battery cycle. In a closed, self-contained metal-halogen battery system, the storage subsystem is used to contain the halogen gas or liquid which is liberated from the cells during the charging of the battery system for subsequent return to the cells during the discharging of the battery system. In the zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid, (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting temperature to increase, such as by circulating a warm liquid through the store container. The chlorine gas thereby recovered is returned to the electrode stack via the electrolyte circulation subsystem, where it is reduced at the chlorine electrodes. Simultaneously, the zinc metal is dissolved off of the zinc electrode substrates, and power is available at the battery terminals.

Over the course of the zinc-chloride battery charge/discharge cycle, the concentration of the electrolyte varies as a result of the electrochemical reactions occurring at the electrodes in the cells of the electrode stack. At the beginning of charge, the concentration of zinc-chloride in the aqueous electrolyte may typically be 2.0 Molar. As the charging portion of the cycle progresses, the electrolyte concentration will gradually decrease with the depletion of zinc and chlorine ions from the electrolyte. When the battery system is fully charged, the electrolyte concentration will typically be reduced to 0.5 Molar. Then, as the battery system is discharged, the electrolyte concentration will gradually swing upwardly and return to the original 2.0 Molar concentration when the battery system is completely or fully discharged.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 5,809,578 entitled "Process For Forming And Storing Halogen Hydrate In A Battery"; Carr et al U.S. Pat. No. 3,909,298 entitled "Batteries Comprising Vented Electrodes And Method Of using Same"; Carr U.S. Pat. No. 4,100,332 entitled "Comb Type Bipolar Electrode Elements And Battery Stack Thereof". Such systems are also described in published reports prepared by the assignee herein, such as "Development of the Zinc-Chloride Battery for Utility Applications", Interim Report EM-1417, May 1980, and "Development of the Zinc-Chloride Battery for Utility Applications", Interim Report EM-1051, April 1979, both prepared for the Electric Power Research Institute, Palo Alto, Calif. The specific teachings of the aforementioned cited references are incorporated herein by reference.

The present invention is directed to an improved flow-through porous electrode structure for electrochemical systems having circulating electrolytes, and which is also especially advantageous in zinc-chloride battery systems. Prior unipolar porous electrode structures for zinc-chloride battery systems have generally comprised two electrode members which were either separated by a non-conductive frame or profiled to form an internal cavity between the two members. One of these two approaches is discussed in detail in the commonly assigned Carr et al U.S. Pat. No. 4,241,150, entitled "Method For Control Of Edge Effects Of Oxidant Electrode", which is hereby incorporated by reference. A detailed discussion of the other of these approaches may be found in the "Development of the Zinc-Chloride Battery for Utility Applications" report, May, 1980, identified above. While these prior approaches have their respective advantages, one drawback is their relative vulnerability to bowing and breakage. With the internal cavity of these prior approaches, a substantial portion of the surface area of the electrodes members was unsupported with respect to transversely directed forces. Accordingly, the electrolyte flowing through the porous electrode members from the internal cavity would have a tendency to bow both electrode members outwardly. Although efforts have been to reinforce the two electrode members of these prior designs, these efforts have been limited to reinforcing only the center of the electrodes, such as by employing a pin to connect the two electrodes together at the center.

When graphite is used to construct the porous electrode members in zinc-chloride battery systems, these electrodes typically undergo a "activation" process to decrease the oxidation and reduction chlorine overvoltages of these electrodes. A detailed discussion of typical activation processes may be found in the following commonly assigned patents: Hart, U.S. Pat. No. 4,120,774 entitled "Reduction Of Electrode Overvoltage"; Laetham et al, U.S. Pat. No. 4,273,839 entitled "Activating Carbonaceous Electrodes". The specific teachings of these references are hereby incorporated by reference. Due to the nature of these activation processes, the porous graphite electrodes are placed in a substantially more stressful environment than encountered during normal battery operation. Depending on the intensity and length of these activation processes, the tendency of the prior porous electrodes to bow or break is exacerbated due to the severity of this environment. As will be appreciated by those skilled in the art, any deformation of the electrodes will alter the cell geometry, and thereby adversely affect the performance of the cell.

Accordingly, it is a principle object of the present invention to provide an improved flow-through porous electrode structure for electrochemical systems having circulating electrolytes.

It is a more specific object of the present invention to provide a flow-through porous electrode structure which has increased mechanical strength to resist any tendency towards bowing, breakage, or other deformation.

It is another object of the present invention to provide a flow-through porous electrode structure which has the ability to withstand a severe activation process to achieve enhanced voltaic performance of the electrode and/or decrease the time required for activation.

It is a further object of the present invention to provide a flow-through porous electrode structure which controls the flow of electrolyte through the electrode, yet also achieves a uniform distribution of electrolyte flow through the electrode.

It is an additional object of the present invention to provide a flow-through porous electrode structure for a zinc-chloride battery system which may readily be employed in a comb-type cell element providing the basic building block for constructing electrode stacks.

To achieve the foregoing object, the present invention provides a flow-through porous electrode structure generally comprising a porous electrode having two planar opposing faces, each of which provides a reaction surface for electron-transfer reactions of the same polarity. The porous electrode includes spaced passage means which extends at least in part through the electrode between the opposing faces for distributing the circulating electrolyte through the electrode. In a preferred form of the invention, the porous electrode comprises a single electrically conductive porous member which has the same outer dimensions as those employed for prior electrode structures of the same type. The passage means comprises a plurality of vertically spaced, generally horizontal disposed passageways extending from a first side of the porous member. These passageways have a generally circular cross-section and extend substantially across the width of the porous electrode member.

Additional advantages and features of the present invention will become apparent from a reading of the detailed description of the preferred embodiment which makes reference to the following set of drawings in which:

BRIEF DESCRIPTION OF THE DRAWINGS

FIG. 1 is a perspective view of a flow-through porous electrode structure for an electrochemical system having a circulating electrolyte according to the present invention.

FIG. 2 is a top elevation view of the electrode structure shown in FIG. 1.

FIG. 3 is a side elevation view of the electrode structure shown in FIG. 1, particularly illustrating the spaced passage means according to the present invention in phantom lines.

FIG. 4 is a side elevation view of the electrode structure shown in FIG. 1, taken generally along the lines 4—4 of FIG. 3.

FIG. 5 is a fragmentary top elevation view of a comb-type cell element employing the flow-through porous electrode structure according to the present invention.

DETAILED DESCRIPTION OF THE PREFERRED EMBODIMENT

Referring to FIG. 1, a perspective view of a flow-through porous electrode structure 10 for an electrochemical system having a circulating electrolyte is shown. The electrode structure 10 includes a single unitary electrically conductive porous member 12 which is generally rectangular in shape. The electrode member 12 includes two planar opposing faces 14 and 16 which each provide a reaction surface for electrochemical electron-transfer reactions of the same polarity. Accordingly, the electrode member 12 may be characterized as a unipolar electrode which has two active surfaces for oxidizing or reducing an electrochemical species. In the zinc-chloride battery system, this electrochemical species is chlorine, and the electrode member 12 is typically referred to as the "chlorine" or positive electrode. During the charging of a zinc-chloride battery system, chloride ions are oxidized at the "chlorine" electrode to generate chlorine gas, while during discharge dissolved chlorine is reduced at this electrode.

Depending upon the particular electrochemical system in which the electrode structure 10 is employed, the electrode member 12 may be constructed from any suitable electrically conductive material which is both electrochemically active and chemically resistant or inert to the electrolyte and other chemical entities with which it will come into contact. In the zinc-chloride battery system, it is preferred that the electrode member 12 be constructed from a porous graphite, such as Union Carbide Corp. PG-60 graphite or Airco Speer 37-G graphite. However, it should be appreciated that other graphites and electrically conductive porous materials may be employed, such as ruthenized titanium.

Referring now to FIGS. 1 through 4, the electrode member 12 is shown to be provided with a plurality of vertically spaced, generally horizontally disposed passageways 18 for distributing the circulating electrolyte through the electrode. As may best be seen with respect to FIG. 3, the passageways 18 extend generally from a first side 20 of the electrode member 12 substantially across the width of the electrode member. The electrode member 12 is also provided with a generally vertically disposed, outwardly opening channel 22, which is formed along the first side 20 of the electrode member for conveying the circulating electrolyte to the passageways 18. The channel 22 is also formed with an outwardly projecting barrier portion 24 which operates to prevent electrolyte flow out through the bottom of the electrode member 12 in cooperation with a bus bar structure to be described with reference to FIG. 5. The electrode member 12 is also provided with a generally vertically disposed venting passageway 26 which is in communication with each of the passageways 18 for facilitating the release of any undissolved gas present in the passageways 18. Since the electrode member 12 is porous, both gas and liquid will permeate the electrode structure, by working their way from the passageways 18 through the pores of the electrode member 12 to the exterior opposing faces 14 and 16 of the electrode member. However, depending upon the porousity of the electrode member 12, the viscosity of the electrolyte, and the amount of undissolved gas entrained with the electrolyte, the venting passageway 26 will serve to ensure that no undissolved gas is trapped within the electrode structure. In order to facilitate a uniform distribution of electrolyte through the electrode member 12, it is preferred that the venting passage 26 be disposed in close proximity to a second side 28 of the electrode member 12. In one form of the present inventio, the distance between the second side 28 of the electrode member 12 and the edge of the venting passageway 26 is approximately one half of the distance between the passageways 18.

As may best be seen with reference to FIG. 4, the passageways 18 have a generally circular cross section which is less than one third of the thickness of the electrode member 12. However, it should be appreciated that the shape and cross sectional magnitude of the passageways 18 may be varied depending upon the particular application of the electrode structure 10. Similarly, although the electrode member 12 is provided with a total of twenty passageways 18, the number of these passageways may also vary in accordance with the particular application of the electrode structure 10. In one form of the present invention, it is preferred that the number of passageways 18 be between five and thirty-five, and that these passageways be equally spaced. Since the size, number and spacing of these passageways will affect the distribution of electrolyte through the electrode member 12, the dimensions for these variables should be selected to provide for a substantially uniform distribution of electrolyte flow through the electrode member. Additionally, another consideration which would be expected to significantly affect the dimensions of the above variables would be the hydraulic effect of the passageways 18 on the electrolyte circulation. With the elimination of the large internal cavity employed in prior unipolar electrode structures of this type, a significant increase in the pressure drop across electrode structure 10 would be expected due to the constriction of electrolyte flow through the passageways 18. However, it has been found that the passageways according to the present invention do not appreciably affect the pressure drop across the electrode structure 10 while still providing a uniform distribution of electrolyte flow through the electrode member 12.

One important advantage of the present invention with respect to electrode structures having a large internal cavity, is a substantial increase in the amount of electrically conductive porous material used to construct the electrode member 12. Thus, for example, where graphite is employed to construct the electrode member 12, a substantial increase in the amount of graphite contained in the electrode member will be provided in order to fill the areas between the passageways 18. This increase in graphite has the combined effect of significantly increasing the mechanical strength of the electrode structure 10 and enhancing the electroconductivity of the electrode structure. Contrary to prior electrode structures where the internal cavity separated two generally independent electrode members, the passageways 18 according to the present invention permit the electrode structure to operate as a single electrode member which permits the conduction of electricity generally throughout the electrode structure. This enhanced electroconductivity of the electrode structure 10 has also been found to enhance the voltaic characteristics of the porous electrodes in the zinc chloride battery cells. This increase in the voltaic performance during both charge and discharge is also believed to be due in part to a more uniform current distribution throughout the electrode structure 10 and/or an increase in the electrochemical activity of the electrode structure as a result of a more intense activation process. As to the increased mechanical strength of the electrode structure 10, it should be appreciated that the presence of the graphite between the passageways 18 will support or reinforce the structure along substantially the entire height and width of the electrode member 12. Accordingly, any tendency of the exterior faces 14 and 16 of the electrode member 12 to bow outwardly is resisted or prevented by the graphite provided between the passageways 18.

In one form of the present invention, the passageways 18, as well as the venting passageway 26, are mechanically formed in the electrode member 12 by a suitable drilling mechanism. Since this drilling process may leave some graphite debris within the passageways, it is preferred that the passageways be cleaned with an appropriate wire brush and rinsed with deionized water before further use. Although this machining process will inevitably affect the cost of manufacturing the electrode structure 10, it should be noted that this cost will be offset, at least in part, by the elimination of the plastic or other nonconductive frame previously used to provide the internal cavity between two electrode members.

Referring to FIG. 5, a fragmentary top elevation view of a comb-type cell element 30 employing the flow-through porous electrode structure according to the present invention is shown. The cell element 30 includes an electrically conductive bus member 32 having two generally planar opposing faces 34 and 36. A plurality of porous electrode structures 38 are attached to the exterior face 34 of the bus member 32 via a press or interference fit connection. The cell element 32 is also provided with a plurality of electrode structures 40 which are attached to the exterior face 36 of the bus member 32 via a similar press or interference fit connection. It should be noted that the electrode structures 38 and 40 are laterally staggered to permit the interdigitation of adjacent comb-type cell elements in the electrochemical system. To illustrate this interdigitation of adjacent cell elements, the electrode structures from adjacent cell elements are indicated by their corresponding reference numeralsl primed. A more detailed discussion of these comb-type cell elements may be found in the Carr U.S. Pat. No. 4,100,332, entitled "Comb-Type Bipolar Electrode Elements and Battery Stacks Therefor" identified above.

The electrode structures 38 in the comb-type cell element 30 each comprise flow-through porous electrode structures corresponding to the electrode structure 10 illustrated in FIGS. 1 through 4. The electrode structures 40 each comprise a single electrode member adapted to have a polarity opposing that of the electrode structures 38. In the zinc-chloride battery system, the electrode structures 40 each are constructed from a dense or fine grained graphite which is generally both liquid and gas impermeable, such as Union Carbide Corp. CS grade graphite. The bus member 32 is also comprised of a dense or fine grain graphite which has been preferably coated with a nonconductive material or otherwise masked from participating in any electrochemical reactions.

The comb-type cell element 30 is also provided with a plurality of feed tubes 42 which are adapted to be nestingly received in a channel 44 of the electrode structures 38 (generally corresponding to the channel 22 of the electrode structure 10). The feed tubes 42 serve to convey the circulating electrolyte to each of the electrode structures 38. However, it should be appreciated that other suitable conduit means may be provided in the appropriate application to serve this function. The feed tubes 42 may be made from any suitable electrically nonconductive material which is chemically resistant or inert to the electrolyte and other chemical entities with which they will come in contact. While it is preferred that DuPont Teflon (tetrafluorinated ethylene) be employed to construct the feed tubes 42, other suitable plastic materials which may be employed are Penwalde Kinard (polyvinylidene fluoride), General Tire and Rubber Corp., Boltron polyvinylchloride (4008-2124), or any of the other appropriate materials described in Section 33 of The Development of the Zinc-Chloride Battery for Utility Applications, April 1979 report identified earlier. It should also be noted that each of the electrode structures 38 includes a barrier corresponding to the barrier 24 of electrode structure 10 for preventing the flow of electrolyte through the bottom of the electrode structures. When the electrode structures 38 are appropriately mounted to the bus member 32, these barrier portions will be in contact with the exterior face 34 of the bus member to block the flow of electrolyte. Although a press or interference fit connection is illustrated in FIG. 5, it should be appreciated that other suitable mounting techniques may be employed in the appropriate application. Additionally, it is contemplated that the bus member 32 could itself be provided with suitable channels or other electrolyte conveying means in the place of the channels 44 of the electrode structures 38.

Another advantage of the present invention is that the flow-through porous electrode structures 10 and 38 may have the same exterior dimensions as that employed for previous electrodes in the appropriate electrochemical systems. Thus, in a zinc-chloride battery system which employs a comb-type cell element as the basic building block for constructing large electrode stacks, the flow-through porous electrode structures 10 and 38 may be employed in the cell elements without otherwise affecting the cell geometry. However, it should be appreciated that other sizes and shapes of the electrode structures 10 and 28 may be provided in the appropriate application.

It will be appreciated that the above disclosed embodiment is well calculated to achieve the aforementioned objects of the present invention. In addition, it is evident that those skilled in the art, once given the benefit of the foregoing disclosure, may now make modificiations of the specific embodiment described herein without departing from the spirit of the present invention. Such modifications are to be considered within the scope fo the present invention which is limited solely by the scope and spirit of the appended claims.

What is claimed is:

1. An electrode assembly for metal-halogen pumped electrolyte battery comprising:
   electrically conductive elongated bus member having generally opposing faces;
   a porous unitary electrode having two generally planar opposing faces, each of which provide a reaction surface for electron-transfer reactions of the same polarity;
   said electrode being generally rectangular and defining lengthwise and widthwise dimensions;
   said porous electrode being connected by means of interference fit to one of said opposing faces of said bus member such that said lengthwise and widthwise dimensions are orthogonal to said bus member;
   said porous electrode having first and second parallel sides extending lengthwise along said opposing faces, said first side contacting said bus member;
   a channel formed along said first side and extending substantially the entire lengthwise dimension of said electrode, said channel having a barrier portion disposed in an end of said channel, said barrier portion cooperating with said bus bar to inhibit electrolyte flow through the bottom of said electrode;
   a plurality of parallel passageways extending within the interior of said electrode and parallel to said widthwise dimension, said passageways communicating with said channel and terminating within the interior of said electrode and adjacent said second side;
   a venting passageway extending within the interior of said electrode and parallel to said lengthwise dimension, said venting passageway communicating with said parallel passageways and adjacent said second side;
   feed tube disposed at least partially within said channel for introducing electrolyte into said channel.

2. The electrode assembly of claim 1 wherein said porous electrode comprises a graphite material.

3. The electrode assembly of claim 1 wherein said parallel passageways are spaced a predetermined first distance apart and wherein said venting passageway is disposed a second distance from said second side, said second distance being less than said first distance.

4. The electrode assembly of claim 3 wherein said second distance is approximately one-half said first distance.

5. The electrode assembly of claim 1 further comprising at least twenty generally equally spaced parallel passageways.

6. The electrode assembly of claim 1 wherein said feed tube is constructed of a plastic material.

* * * * *